United States Patent
Cegueda et al.

(10) Patent No.: US 10,538,419 B2
(45) Date of Patent: Jan. 21, 2020

(54) TRANSPORT ASSEMBLY HAVING A CART FOR TRANSFERRING ARTICLES

(71) Applicant: Ford Motor Company, Dearborn, MI (US)

(72) Inventors: Cowalski Cegueda, Piamonte (MX); Frederick Dunbar, Dearborn, MI (US); Kurt Frohriep, Madison Heights, MI (US)

(73) Assignee: Ford Motor Company, Dearborn, MI (US)

( * ) Notice: Subject to any disclaimer, the term of this patent is extended or adjusted under 35 U.S.C. 154(b) by 197 days.

(21) Appl. No.: 15/712,417

(22) Filed: Sep. 22, 2017

(65) Prior Publication Data

US 2019/0092611 A1    Mar. 28, 2019

(51) Int. Cl.
| | | |
|---|---|---|
| *B66F 7/06* | (2006.01) | |
| *B62B 5/04* | (2006.01) | |
| *B66F 9/065* | (2006.01) | |
| *B66F 13/00* | (2006.01) | |
| *B62B 3/02* | (2006.01) | |
| *B62B 3/04* | (2006.01) | |

(52) U.S. Cl.
CPC .............. *B66F 7/0625* (2013.01); *B62B 3/02* (2013.01); *B62B 3/04* (2013.01); *B62B 5/0495* (2013.01); *B66F 9/065* (2013.01); *B66F 13/00* (2013.01)

(58) Field of Classification Search
CPC ..... B62B 3/04; B62B 5/0495; B62B 2203/74; B66F 7/0625; B66F 9/065; B66F 11/00; B66F 13/00; B65G 1/0414
USPC .............. 414/396, 402, 284; 280/47.35, 79.3
See application file for complete search history.

(56) References Cited

U.S. PATENT DOCUMENTS

| | | | | |
|---|---|---|---|---|
| 1,640,263 A | * | 8/1927 | Burgett | B62B 3/04 414/341 |
| 2,777,584 A | * | 1/1957 | Dobrin | A47F 7/0078 108/148 |
| 4,117,937 A | * | 10/1978 | Ratti | A47B 57/04 211/189 |
| 4,219,186 A | * | 8/1980 | Brewer | B62B 3/04 254/9 C |
| 4,265,583 A | * | 5/1981 | Baird | B66F 9/12 414/246 |
| 4,670,227 A | * | 6/1987 | Smith | A61L 11/00 422/297 |
| 4,697,974 A | * | 10/1987 | Eltoukhy | H01L 21/67173 118/500 |

(Continued)

FOREIGN PATENT DOCUMENTS

| | | |
|---|---|---|
| DE | 3907360 | 9/1990 |
| DE | 4207988 | 9/1993 |

(Continued)

OTHER PUBLICATIONS

Custom Lift Tables—Conveyor Rotate, Liftproducts Inc., at URL https://www.liftproducts.com/lifttables/custom.html, May 22, 2017.

*Primary Examiner* — James Keenan
(74) *Attorney, Agent, or Firm* — Burris Law, PLLC

(57) ABSTRACT

An article transport assembly includes a lift cart and one or more carriers. The lift cart includes a main body and a table disposed on the main body. The carriers are disposed on a surface of the table. Each carrier is configured to support an article and includes a panel and at least two wheels attached to an underside of the panel. The carriers are operable to move along a surface of the table.

17 Claims, 5 Drawing Sheets

(56) References Cited

U.S. PATENT DOCUMENTS

| | | | | |
|---|---|---|---|---|
| 4,743,040 A * | 5/1988 | Breveglieri | ............... | B62B 3/10 |
| | | | | 280/47.35 |
| 5,018,931 A * | 5/1991 | Uttley | ....................... | A61G 7/08 |
| | | | | 188/5 |
| 5,069,464 A * | 12/1991 | Braconnier | .............. | B25H 5/00 |
| | | | | 280/47.35 |
| 5,072,960 A * | 12/1991 | Sperko | ....................... | B62B 3/04 |
| | | | | 16/35 D |
| 5,441,376 A * | 8/1995 | Napierkowski | .......... | B01J 3/002 |
| | | | | 14/71.1 |
| 5,779,428 A * | 7/1998 | Dyson | .................... | B65G 13/11 |
| | | | | 193/35 A |
| 6,089,812 A * | 7/2000 | Junker | ................. | B23Q 7/1436 |
| | | | | 414/396 |
| 6,431,319 B1 * | 8/2002 | Myers | ....................... | B62B 3/02 |
| | | | | 187/243 |
| 6,494,671 B1 * | 12/2002 | Takaiti | ................. | H05K 13/021 |
| | | | | 414/809 |
| 7,392,993 B1 * | 7/2008 | Prohl | ...................... | A47F 5/137 |
| | | | | 280/33.998 |
| 9,327,952 B1 * | 5/2016 | Kolharkar | ............... | B66F 9/127 |
| 9,540,220 B2 * | 1/2017 | Stewart | .................. | B66F 7/0625 |
| 9,809,241 B2 * | 11/2017 | Polidoros | .................. | B62B 3/04 |
| 9,815,672 B2 * | 11/2017 | Baudermann | ......... | B66F 7/0625 |
| 10,160,469 B2 * | 12/2018 | Grou | ......................... | B62B 3/04 |
| 2006/0078409 A1 * | 4/2006 | Takeda | ...................... | B62B 3/04 |
| | | | | 414/343 |
| 2018/0050862 A1 * | 2/2018 | Wu | ........................ | B65D 19/14 |
| 2019/0084602 A1 * | 3/2019 | Ribbe | ................... | B62B 3/10 |

FOREIGN PATENT DOCUMENTS

| | | | | |
|---|---|---|---|---|
| DE | 19703240 | | 11/2005 | |
| DE | 102011013253 | | 9/2012 | |
| DE | 102015114409 A1 * | | 3/2017 | ............... B62B 3/02 |
| WO | WO-2009118856 A1 * | | 10/2009 | ............. B62B 5/049 |
| WO | WO-2016026910 A1 * | | 2/2016 | ........... B65G 1/0492 |
| WO | 2016083048 | | 6/2016 | |

\* cited by examiner

TRANSPORT ASSEMBLY HAVING A CART FOR TRANSFERRING ARTICLES

FIELD

The present disclosure relates to a transport assembly, and more particularly, a transport assembly including cart for moving articles.

BACKGROUND

The statements in this section merely provide background information related to the present disclosure and may not constitute prior art.

Carts are used in a variety of applications to transport components from one location to another location. In one application, manufacturing facilities use carts to transfer equipment to different machines. For example, honing machines may require routine cardanic fixture changeovers during which the cardanic fixture in the honing machine are replaced with new fixtures. This operation may require one cart for holding the fixtures and a second cart for holding a mobile hoist that replaces the fixtures. Such changeover operation can be time consuming and thus, affect manufacturing output.

Furthermore, transferring components from one position to another can be physically demanding, even if the distance is a few inches. These and other issues are addressed by the teachings of the present disclosure.

SUMMARY

In one form, the present disclosure is directed towards an article transport assembly that includes a lift cart and one or more carriers. The lift cart includes a main body and a table disposed on the main body. The one or more carriers are disposed on a surface of the table. Each carrier is configured to support an article, and includes a panel and at least two wheels attached to an underside of the panel. The carriers are operable to move along a surface of the table.

In another form, the article transport assembly further includes a railing disposed along a periphery of the table. The railing defines an opening through which an article is moved to and from the table.

In yet another form, the article transport assembly further includes one or more locks to fasten and unfasten the carriers to the table.

In one form, the table defines a plurality of apertures extending through a surface of the table, each of the carriers defines a hole extending through the panel, and the lock includes a post. In a lock state, the post extends in an aperture from the plurality of apertures of the table and in the hole of the carrier to fasten the carrier to the cart. In an unlock state, the post is above the aperture to unfasten the carrier from the table.

In another form, the lift cart is a scissor lift cart.

In yet another form, the table extends beyond a periphery of the main body of the lift cart.

In one form, the lift cart includes a cart lock to fasten and unfasten the lift cart to and from an object receiving the article. The cart lock extends from an underside of the table adjacent to the main body.

In another form, at least one of the carriers is vacant when the cart is being moved.

In one form, the present disclosure is directed toward an article transport assembly that includes a lift cart, a plurality of skateboards, a first lock, and a plurality of second locks. The lift cart includes a table, where a height of the table is adjustable. The plurality of skateboards are disposed on a surface of the table and are operable to move along the surface. The first lock is disposed on the lift cart and operable to lock a position of the lift cart relative to an object. The plurality of second locks are disposed with the plurality of skateboards and operable to fasten the skateboard to the table of the lift cart.

In another form, the article transport assembly includes a railing extending along a periphery of the table. The railing defines an opening through which an article is moved to and from a skateboard among the plurality of skateboards.

In yet another form, the table defines a plurality of apertures extending through the surface of the table, each of the skateboards defines a hole extending through the skateboard, and each of the plurality of second locks includes a handle and a post extending from the handle. The post extends in an aperture from the plurality of apertures of the table and in the hole of a skateboard from the plurality of skateboards to fasten the skateboard to the lift cart. The handle is operable to move the second lock from and place the second lock in the aperture to unfasten and fasten the skateboard from the table.

In one form, the first lock extends from an underside of the table and is configured to engage with a sidewall member of an object to secure the lift cart to the object.

In another form, the first lock includes a slot that engages with an edge of the sidewall member of the object.

In one form, the present disclosure is directed toward a transport assembly for transporting cardanic fixtures to a honing machine. The assembly includes a scissor cart, at least two skateboards, and a plurality of locks. The scissor cart includes a table, where a height of the table is adjustable. The skateboards are disposed on and moveable along a surface of the table. Each of the skateboards includes a slot for holding a fixture. The plurality of locks are operable to fasten and unfasten the skateboards to and from the table.

In another form, during a transport operations of the fixtures, at least one of the skateboards is vacant.

In yet another form, the transport assembly further includes a railing disposed along a periphery of the table. The railing defines an opening through which a fixture is moved to and from the table.

In one form, the transport assembly further includes a cart lock extending from an underside of the table. The cart lock is configured to engage with a fixture access door of the honing machine.

In another form, the scissor cart defines a channel for receiving fluid from the fixtures being transported by the cart.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
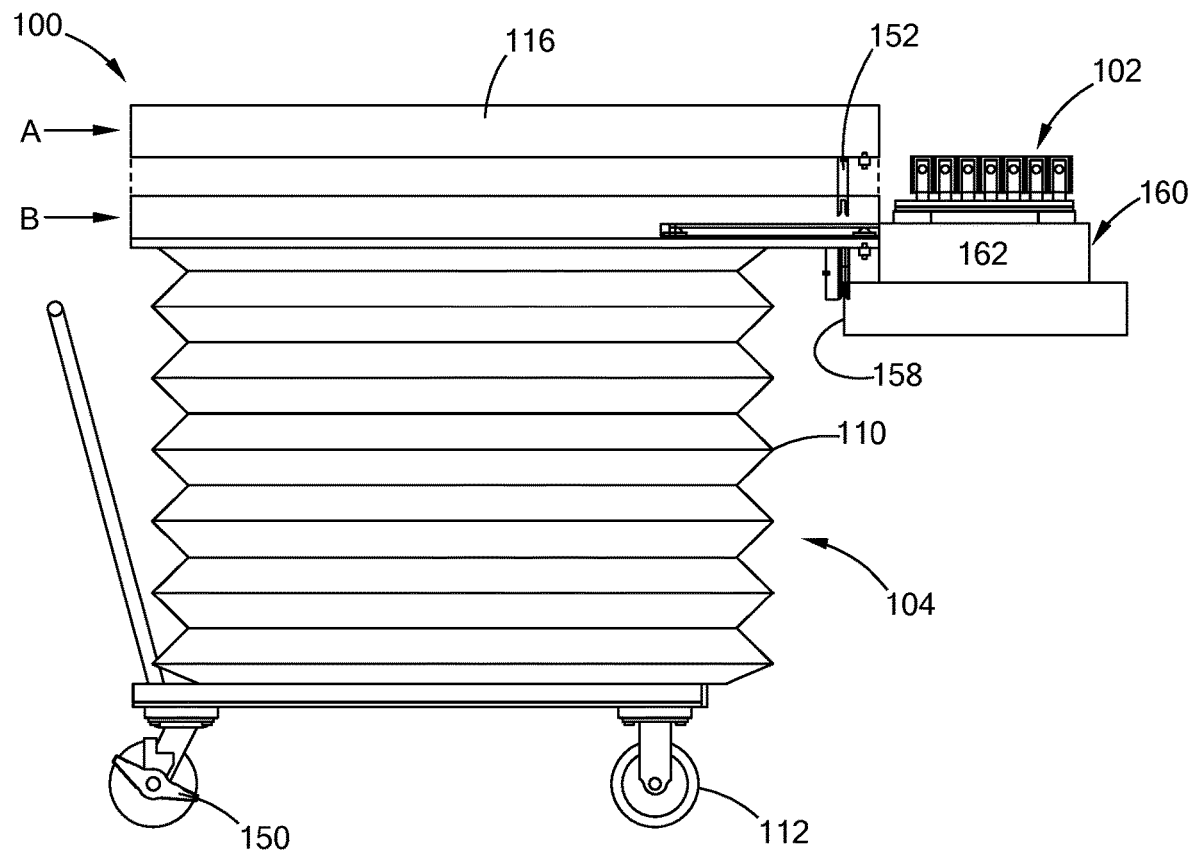
FIG. 1A is a perspective view of a transport assembly in accordance with teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
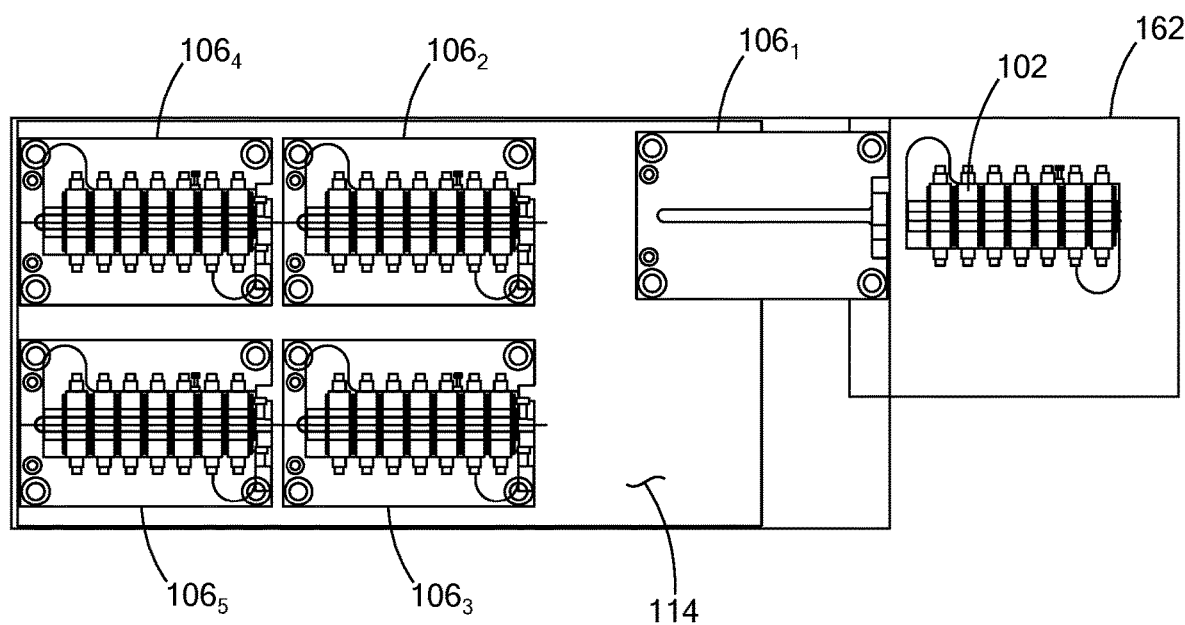
FIG. 1B is a partial top view of the transport assembly of FIG. 1A.

Referring to FIGS. 1A and 1B, a transport assembly 100 of the present disclosure is operable to transport one or more articles 102 (e.g., fixtures, parts, etc) to, for example, a machine. In one form, the transport assembly 100 includes a lift cart 104 and one or more carriers 106 (e.g., $106_1$ to $106_5$ in figures) for supporting the article 102 to be transferred.

The lift cart 102 includes a body 110, a plurality of wheels 112 attached to the underside of the body 110, and a table 114 disposed on the body 110. The body 110 includes a height adjustment mechanism for lifting and supporting the table 114. For example, in one form, the body 110 is configured as a scissor cart lift that includes a hydraulic pump or an electric motor for adjusting the height of the table 114. The present disclosure is also applicable to other height adjustable cart and should not be limited to scissor cart lifts.

Figure 2:
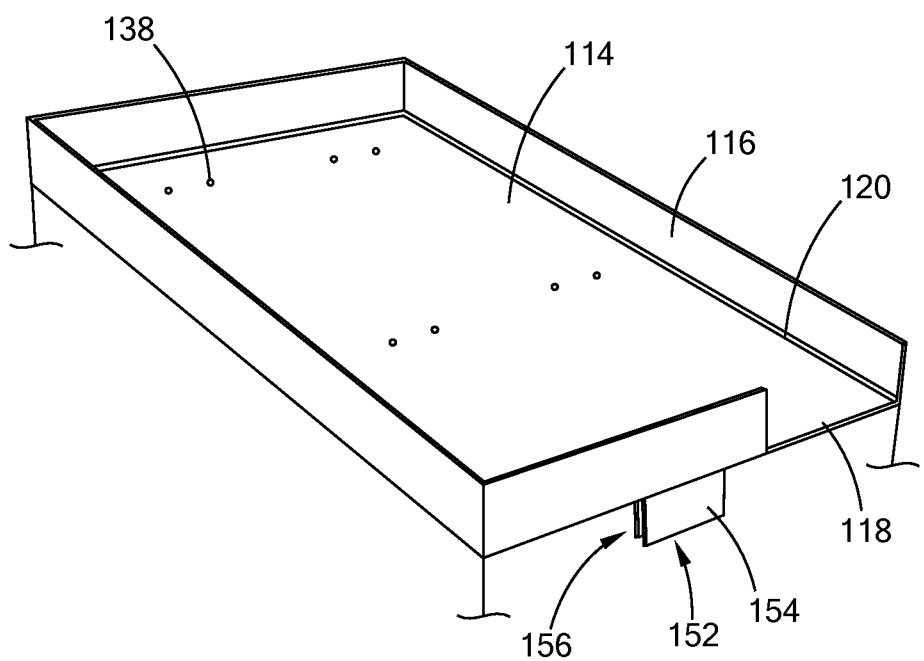
FIG. 2 is perspective view of a table of the transport assembly in accordance with teachings of the present disclosure.

The lift cart 102 is configurable in various suitable ways based on the articles 102 and the carriers 106 being transported. Referring to FIG. 2, in one form, the lift cart 102 includes a railing 116 disposed along a periphery of the table 114 to prevent the carriers 106 from falling off the cart 104. The railing 116 further defines an opening 118 through which the article 102 are transferred to and from the cart 102. In another form, to accommodate articles that may have fluid, the lift cart 104 has a channel 120 defined between the table 114 and the railing 116 for collecting fluid dripping from the article 102, thereby preventing fluid from collecting on the surface of the table 114.

Figure 3A:
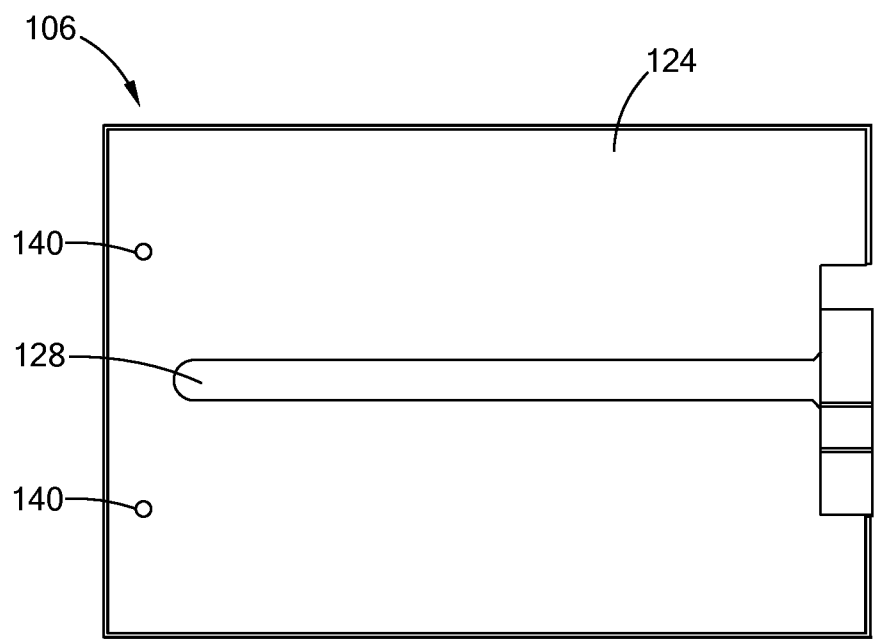
FIG. 3A is a top view of a carrier of the transport assembly in accordance with teachings of the present disclosure.
Figure 3B:
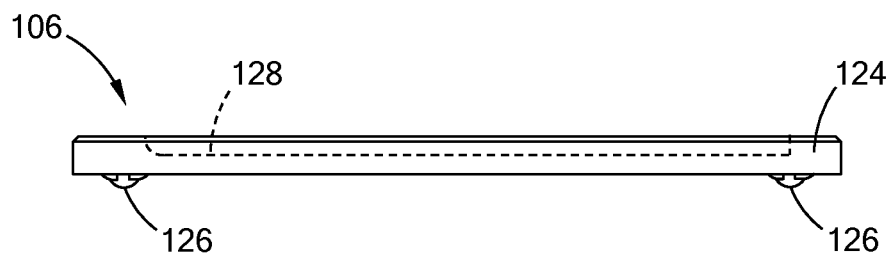
FIG. 3B is a side view of the carrier of the transport assembly in accordance with teachings of the present disclosure.

Referring to FIGS. 3A and 3B, the carriers 106, which may also be referred to as skateboards, include a panel 124 and multiple wheels 126 attached to the underside of the panel 124. The carriers 106 are operable to slidingly move along the table 114. The carriers 106 can be configured in various suitable ways for holding the article 102, and thus, can be customized for a specific application. For example, in one form, the carriers 106 are configured to receive cardanic fixtures for honing machine, and include a slot 128 defined along a surface of the panel 124 to accommodate the fixture.

Figure 4:
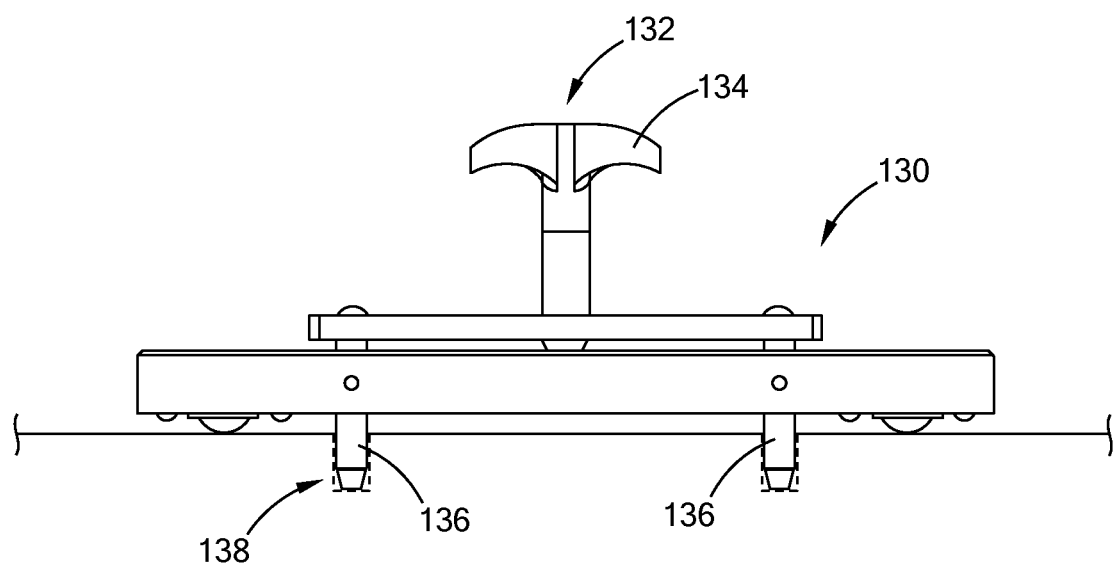
FIG. 4 is perspective view of the carrier fastened to the table by way of a carrier lock in accordance with teachings of the present disclosure.

To prevent unwanted movement of the carriers 106, the assembly 100 further includes a carrier lock for fastening and unfastening the carriers 106 to the table 114. Referring to FIG. 4, in one form, a carrier lock 130 includes a stake member 132 having a handle 134 and one or more posts 136 extending from the handle 134. The table 114 and the carrier 106 are configured to receive the stake member 132. For example, in one form, the table 114 may define a plurality of apertures 138 or ports, and each of the carriers 106 defines holes 140 (FIG. 3A) extending through the panel 124. The apertures 138 and the holes 140 are part of the carrier lock 130. That is, to fasten the carrier 106 to the table 114, the posts 136 of the stake member 132 extend through the holes 140 of the carriers 106 and one or more apertures 138 of the table 114. The stake member 132 can be removed and installed by way of the handle 134. While one form of a lock is illustrated, other lock mechanism may also be used and are within the scope of the present disclosure. For example, the lock may be a brake member disposed at the wheels 126 of the carriers 106, and operable to engage and disengage with the wheels to prevent the wheels from moving.

To control the movement of the lift cart 104, the article transport assembly 100 includes one or more cart locks that are operable to hold the position of the cart 104. With continuing reference to FIGS. 1A and 2, in one form, the cart lock is provided as brakes 150 disposed with one or more wheels of the cart, and operable to engage and disengage with the wheels. In another form, the cart lock is provided as a slot member 152 that couples the cart lift 104 to the machine receiving the articles 102. For example, the slot member 152 includes a panel 154 that defines a slot 156 that engages with a sidewall portion 158 of a staging area 160 of the machine. In one form, to couple to the sidewall portion 158, the height of table 114 is adjusted to be above the sidewall portion 158, as indicated by position "A" in FIG. 1A and then lowered such that the sidewall portion 158 rests within the slot 156 of the slot member 152, as indicated by position "B" in FIG. 1A. The sidewall portion 158 can be located at other suitable locations of the machine and should not be limited to the staging area. The cart lift 104 can include other suitable cart locks that are operable to restrict the movement of the cart lift 104, and should not be limited to locks described herein.

An exemplary application of the transport assembly 100 is described herein. The assembly is configured to transport new cardanic fixtures to a honing machine and exchange the new fixtures with worn fixtures disposed in the machine. In one form, the transport assembly 100 is configured to include multiple carriers $106_1$ to $106_5$ with at least one empty carrier (i.e., a first carrier $106_1$). The transport assembly 100 is moved and secured to the machine. For example, the table 114 having the slot member 152 disposed along the underside of the table 114 is positioned next to a counter 162 (FIG. 1B) of the staging area 160 of the honing machine. The height of the table 114 is increased and the position of the slot member 152 is aligned to be over the sidewall member 158. The slot member 152 is then lowered to the sidewall member 158, such that the edge of the sidewall member 158 is positioned in the slot 156. In addition to or in lieu of coupling the transport assembly 100 to the machine, the position of the transport assembly 100 may be locked by engaging the brake 150 of the lift cart 104.

To exchange the fixtures from the lift cart 104 with the worn fixtures in the machine, the empty carrier $106_1$ (FIG. 1B) is decoupled from the table 114 and is slidingly moved or, in other words, rolled towards the opening 118 defined by the railing 116, and then coupled to the table 114 via the carrier lock 130. The worn fixture, which is resting on, for example, the counter of the staging are next to the table 114 is then slid onto the surface of the carrier $106_1$. The carrier $106_1$ is then decoupled from the table 114 and moved to an empty position on the table 114 and then coupled to the table. A carrier having a new fixture (i.e., a second carrier 106₂) is then decoupled from the table 114 and then moved towards the opening 118. The new fixture is slid onto the counter 162, and then fed into the machine.

Another worn fixture is then removed from the machine and placed on the counter 162. From the counter 162, the worn fixture is moved onto the second carrier 106₂, and the second carrier 106₂ is then shifted to another location on the table 114, where it is coupled to the table 114 using the carrier lock 130. In one form, one or more of the carriers 106 are slidingly moved along the table 114 to move the second carrier 106₂ to allow another carrier 106 having a new fixture to move to the docking location for unloading a new fixture and receiving a worn fixture. The carriers 106 are shifted one by one towards the opening to unload a new fixture and receive a worn fixture until the machine is equipped with all new fixtures.

By having the carriers, an operator can transfer articles from the cart to the machine by sliding the articles along the table to the opening instead of lifting the article from the cart, thereby limiting the physical operation performed by the operator. In addition, one cart can be utilized for transporting new articles and receiving worn articles, thus reducing the complexity of the operation and reducing the time required to exchange the components.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An article transport assembly comprising:
    a lift cart including a main body and a table disposed on the main body, wherein a height of the table is adjustable;
    a cart lock extending from an underside of the table, wherein the cart lock is configured to engage a sidewall member of an object to secure the lift cart to the object when the table is lowered such that the cart lock is disposed over the sidewall member; and
    one or more carriers disposed on a surface of the table, wherein the one or more carriers are configured to support an article, and each of the one or more carriers includes a panel and at least two wheels attached to an underside of the panel, wherein the one or more carriers are operable to move along a surface of the table.

2. The article transport assembly of claim 1 further comprising a railing disposed along a periphery of the table, wherein the railing defines an opening through which an article is movable to and from the table.

3. The article transport assembly of claim 1 further comprising one or more locks to fasten and unfasten the one or more carriers to the table.

4. The article transport assembly of claim 3, wherein:
    the table defines a plurality of apertures extending through the surface of the table,
    each of the one or more carriers defines a hole extending through the panel, and
    each of the one or more locks includes a post, wherein in a lock state, the post extends in an aperture from the plurality of apertures of the table and in the hole of a carrier to fasten the carrier to the cart, and in an unlock state, the post is above the aperture to unfasten the carrier from the table.

5. The article transport assembly of claim 1, wherein the lift cart is a scissor lift cart.

6. The article transport assembly of claim 1, wherein the table extends beyond a periphery of the main body of the lift cart.

7. The article transport assembly of claim 1, wherein at least one of the one or more carriers is configured to be vacant when the cart is being moved.

8. An article transport assembly comprising:
    a lift cart including a table, wherein a height of the table is adjustable;
    a plurality of skateboards disposed on a surface of the table and operable to move along a surface of the table;
    a first lock disposed on the lift cart and extending from an underside of the table, wherein the first lock is configured to engage a sidewall member of an object to secure the lift cart to the object when the table is lowered such that the first lock is disposed over the sidewall member; and
    a plurality of second locks disposed with the plurality of skateboards and operable to fasten the plurality of skateboards to the table of the lift cart.

9. The article transport assembly of claim 8 further comprising a railing extending along a periphery of the table, wherein the railing defines an opening through which an article is movable to and from a skateboard among the plurality of skateboards.

10. The article transport assembly of claim 8, wherein:
    the table defines a plurality of apertures extending through the surface of the table,
    each of the skateboards defines a hole extending through the skateboard, and
    each of the plurality of second locks includes a handle and a post extending from the handle, wherein the post extends in an aperture from the plurality of apertures of the table and in the hole of a skateboard from the plurality of skateboards to fasten the skateboard to the lift cart, and the handle is operable to move the second lock from and place the second lock in the aperture to unfasten and fasten the skateboard from and to the table.

11. The article transport assembly of claim 8, wherein the lift cart is a scissor lift cart.

12. The article transport assembly of claim 8, wherein the lift cart defines a channel for receiving fluid from an article being transported by the cart.

13. The article transport assembly of claim 8, wherein the first lock includes a slot that engages with an edge of the sidewall member of the object.

14. A transport assembly for transporting cardanic fixtures to a honing machine, the assembly comprising:
    a scissor cart having a table, wherein a height of the table is adjustable;
    at least two skateboards disposed on and moveable along a surface of the table, wherein each of the at least two skateboards includes a slot for holding a fixture; and
    a plurality of locks operable to fasten and unfasten the at least two skateboards to and from the table, the plurality of locks comprising a cart lock extending from an underside of the table, wherein the cart lock is configured to engage a sidewall member of the honing machine and secure the lift cart to the honing machine when the table is lowered such that the cart lock is disposed over the sidewall member.

15. The transport assembly of claim 14, wherein, during transport of the fixtures, at least one of the skateboards is configured to be vacant.

16. The transport assembly of claim 14 further comprising a railing disposed along a periphery of the table, wherein the railing defines an opening through which a fixture is movable to and from the table.

17. The transport assembly of claim 14, wherein the scissor cart defines a channel for receiving fluid from the fixtures being transported by the cart.

* * * * *